Jan. 26, 1926.
H. CHANDLER
VALVE FOLLOWER
Filed Nov. 13, 1922
1,570,728
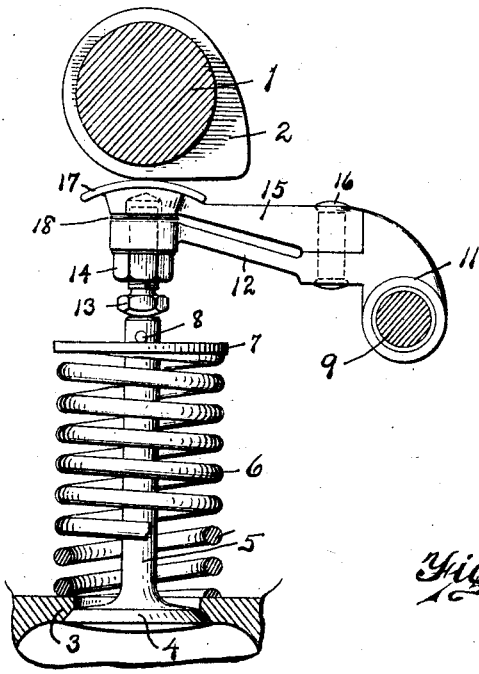
Fig.1.
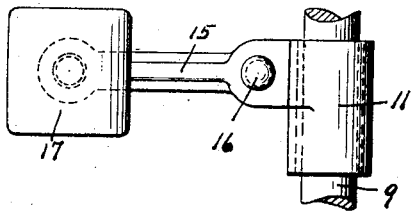
Fig.2.
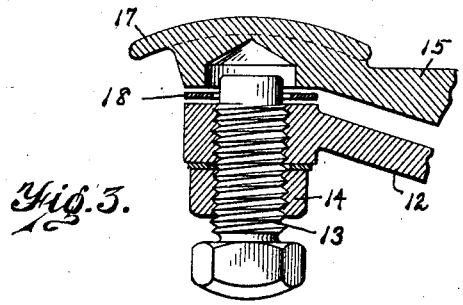
Fig.3.
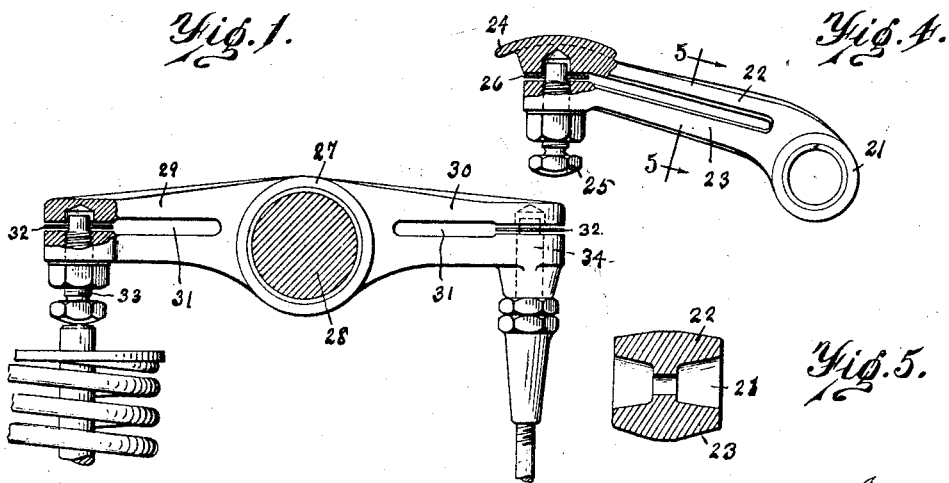
Fig.4.
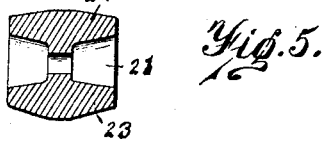
Fig.5.
Fig.6.
Inventor
Henry Chandler
By Edward N. Pagelsen
Attorney Patented Jan. 26, 1926.

1,570,728

UNITED STATES PATENT OFFICE.

HENRY CHANDLER, OF MARYSVILLE, MICHIGAN.

VALVE FOLLOWER.

Application filed November 13, 1922. Serial No. 600,551.

*To all whom it may concern:*

Be it known that I, HENRY CHANDLER, a citizen of the United States, and residing at Marysville, in the county of St. Clair and State of Michigan, have invented a new and Improved Valve Follower, of which the following is a specification.

This invention relates to the construction of the cam followers for the valves of internal combustion engines, and the object of this invention is to provide a device of this character which will eliminate the clicking or rattling noise usually resulting because of the clearances between the cam, valve stem tips and the intermediate parts, and which will permit the valve to seat at a pressure less than that exerted by the valve spring, with the subsequent advantages herein described.

Valves of internal combustion engines are usually actuated by the cams indirectly, that is, through intermediate members such as rocker arms, push rods, tappets and cam followers. The dimensions of these parts and of the valves, cams and cam-shaft, valve housings and cylinder block, change with the motor temperature and these changes vary in the different parts of the engine both in rate (as when the motor is warming up) and in final magnitude.

A variable clearance, depending upon the type of valve and the characteristics of the motor, is therefore usually maintained somewhere between the camshaft and the valve tip to permit the expansion and contraction of the various parts of the valve mechanism to take place without opening the valve. In most engines this clearance is at a maximum when the motor is cold, but in some engines this clearance is at a maximum while the motor is hottest, while in others at some point while the motor is warming up. In usual practice, this clearance varies from one one-thousandth of an inch in some constructions to from fifteen to twenty thousandths of an inch in aircraft and similar motors operating at high temperatures and employing overhead camshafts.

The condition resulting from the presence of this clearance is responsible for two limitations common to the usual poppet valve mechanism.

First—When the tappet clearance exceeds about four one-thousandths of an inch, the mechanism becomes noisy due to the hammer action of the tappet on the valve stem or the rattling of the loose parts.

Second—When a certain size or weight or temperature of valve, or a maximum engine speed, is exceeded, rapid failure of the valve or valve seat will take place from the pounding of the valve upon its seat, due to the action of the valve spring. Since the cam is free from the valve during seating, it is readily seen that the valve must be seated by a force which, when minimum is equal to that exerted by the valve spring and which at high speeds and with heavy valves may be much more, due to the acceleration of the valve through a space of free travel equal to that of the clearance.

In present day practice with comparatively large valves, very heavy springs are required to overcome the inertia of the valve and cause it to "track" or follow the cam motion at high speeds. This subjects the valve to severe pounding during seating and exposes both head, stem and seat to stresses which, especially in the exhaust valve which runs hot, are only met by special valve materials. For very high speed motors of large displacement, operating at high valve temperatures and requiring large valve area, there is no material which meets these conditions for single valves, and lighter multiple valves with weaker springs are used.

The present invention consists in a member adapted to receive movement from a valve cam and transmit such movement to a valve, either directly or indirectly, this member being formed of two parts which are normally spaced apart, one or both of the parts being resilient, and while one of the parts receives the pressure of the cam, the other transmits this pressure to the valve.

It further consists in one or more thin disks of metal in the space between the two parts of the pivoted member in order to present a series of surfaces to hold oil which may act as a cushion between the surfaces when the pressure is sufficiently great to force the two parts together. These disks may be either plain or slotted or split or otherwise formed to increase the cushion effect. These disks are preferably hard, to prevent peening out.

It also consists in the details of construction illustrated in the accompanying drawing and particularly pointed out in the claims.

The drawing shows the adaptation of my invention to constructions of the rocker arm and valve follower type.

In the drawing, Fig. 1 is an elevation of a valve and its operating mechanism. Fig. 2 is a plan of a valve follower. Fig. 3 is a vertical section through the free end of the valve follower. Fig. 4 is a side elevation of a modified form of follower. Fig. 5 is a section on the line 5—5 of Fig. 4. Fig. 6 is an elevation of a rocker or valve actuating lever embodying this invention Similar reference characters refer to like parts throughout the several views.

In Fig. 1 are shown a cam shaft 1, a cam 2 thereon, a valve seat 3, a valve 4 and its stem 5, a spring 6 and the washer 7 against which it bears, a pin 8 to retain the washer, a shaft 9 on which the follower is mounted and a follower consisting of a hub portion 11, a resilient arm 12, an adjustable screw 13 carried thereby and held in position by a nut 14, and a second arm 15 rigidly attached to the hub 11 by means of a rivet 16 or integral therewith as shown in Fig. 4. On the outer end of the arm 15 is a contact plate 17 adapted to be engaged by the cam 2.

In some applications, for manufacturing reasons, it is preferable to have the arm 15 separate from the hub 11 and attached thereto by rivet, bolt or other mechanical means rather than integral therewith as the hub and the arm 12 may be formed of resilient and easily machined metal while the arm 15 may be formed of rigid metal which may be case-hardened in order that the contact plate 17 may be very hard. A further advantage lies in the fact that while the arm 15 may be slightly re-ground after hardening to produce perfect alignment relative to the hub when secured in position, a twist on the arm 12 caused by the hardening would spoil it.

A small plate 18 is preferably placed between the outer ends of the two arms 12 and 15. The follower is so constructed that a movement equal to or slightly greater than the normal clearance required by the expansion of the valve mechanism is had between the ends of the two arms and this movement can be accurately determined by the thickness of this plate 18. In addition thereto, oil may be placed between the plate 18 and the adjacent surfaces and because of the slight distance, and the comparatively large contact area, this oil will act as a cushion and eliminate the clicking noise usually had at the cam mechanism.

Different valve mechanisms will require different spring characteristics in the resilient member, in order to derive the full benefits possible with this construction. By variations in the length and cross-section of the resilient arm and the space between the ends of the arms when free from pressure, the spring characteristics of the mechanism may be altered to meet any particular conditions required. Thus, one may have a soft spring which builds up slowly or a stiff spring which builds up rapidly, or other combinations of spring properties. The proper dimensions, clearance and spring characteristics necessary to accomplish the results desired, i. e., quietness and low seating stresses, are easily determined by those skilled in the art of motor design.

When the elimination of noise is the only object, the arms of the follower as assembled in the mechanism shown in Figure 1, need be under no or very slight compression with the valve closed; and the force necessary to bring together the free ends of this follower may be much less than that exerted by the spring six when the valve is open, the first force being preferably about twenty pounds when the latter is from forty to sixty.

Where, in addition to the above, it is desired to reduce the pounding of the valve on its seat, the mechanism is assembled so that under all conditions with the valve closed, the resilient arm is under a compression equal to something less than the valve spring pressure. The valve then rests against its seat with a pressure equal to the difference of the two springs. In this case the clearance between the free ends of the arms is preferably slightly greater than that necessitated by expansion of the mechanism parts.

The force necessary to bring together the free end of the valve follower in certain cases may be slightly greater even than that exerted by the valve spring but should not be greater than that exerted by the valve spring plus the inertia force necessary to open the valve, without making proper allowance in timing.

Since the compression of the resilient arms is in opposition to that exerted by the valve spring, the arms 12 and 15 may sometimes separate during the closing or inward movement of the valve, especially when the force necessary to close the arms is large in comparison with the valve spring pressure. This separation of the arms is however necessarily slight in comparison with the total movement of the valve and in no manner interferes with "tracking". The resilience of the follower serves to cushion the blow given by the valve stem under the pressure of the spring 6. The resilience of this follower also reduces the violence of the pounding of the valve against its seat.

In Figs. 4 and 5 the hub 21 has attached to it the two arms 22 and 23, the former being formed with the contact plate 24 and the latter carrying the adjusting screw 25. The washer 26 is held between the arms by the screw 25 and may be of any desired thickness to determine the available space between the ends of the arms. The use of this washer allows a wide slot between the arms and therefore more convenient to manufacture.

Where rocker arms are used for actuating the values as in overhead-valve-motors, the construction shown in Fig. 6 may be employed. The rocker arm shown has a hub 27 mounted on a shaft 28. The arms 29 and 30 are formed with slots 31 in which the washers 32 are positioned by the upper ends of the screws 33 and 34. In this case, one or both of the two parts of each arm may be resilient. In this case the clearance at the ends of the two arms is cumulative and need be but very small at each end of the lever.

This invention may be embodied in actuating arms or followers of many different designs without departing from the spirit of my invention as set forth in the following claims.

I claim:—

1. A pivoted member formed of two spaced arms and a hub at their inner ends, the outer end of one arm having a contact plate and a contact screw carried by the outer end of the other arm, one of said arms being resilient.

2. A pivoted member formed of two spaced arms and a hub at their inner ends, the outer end of one arm having a contact plate and a contact screw carried by the outer end of the other arm, one of said arms being resilient, and a plate between the free ends of said arms to determine the available space between them.

3. A pivoted member formed of two spaced arms and a hub to which the arms are connected, an adjustable screw mounted in one of said arms, and a plate mounted on said screw between the free ends of the arms to determine the available space between them.

4. A pivoted member formed by a hub and a resilient arm integral therewith, an adjustable screw mounted in said arm, and a second arm in the plane of the first and attached thereto at its inner end and having a contact plate on the side of its outer end opposite the screw in the other arm.

5. A force transmitting member embodying a pair of arms connected together at one end, the other ends being normally spaced apart, one of the arms being resilient, one of the arms being formed to receive pressure from a cam mechanism, the other being formed to transmit pressure to a valve mechanism and means to limit the relative movement between said arms in one direction.

HENRY CHANDLER.